United States Patent [19]
Yamasaki et al.

[11] Patent Number: 5,632,885
[45] Date of Patent: May 27, 1997

[54] HYDROGEN PEROXIDE REMOVAL EQUIPMENT CAPABLE OF TREATING BOTH WASTE WATER AND WASTE GAS

[75] Inventors: Kazuyuki Yamasaki, Hiroshima; Atsushi Yokotani, Fukuyama, both of Japan

[73] Assignee: Sharp Kabushiki Kaisha, Osaka, Japan

[21] Appl. No.: 684,238

[22] Filed: Jul. 19, 1996

[30] Foreign Application Priority Data

Aug. 1, 1995 [JP] Japan ................. 7-196439

[51] Int. Cl.$^6$ ................. C02F 1/58
[52] U.S. Cl. ................. 210/96.1; 210/150; 210/195.3; 210/218; 210/284; 210/290; 210/919; 422/243
[58] Field of Search ................. 210/96.1, 150, 210/151, 188, 195.3, 205, 220, 919, 218, 284, 290; 422/28, 243

[56] References Cited

FOREIGN PATENT DOCUMENTS 06091258A 5/1994 Japan.

Primary Examiner—Peter A. Hruskoci
Assistant Examiner—Betsey J. Morrison
Attorney, Agent, or Firm—Nixon & Vanderhye P.C.

[57] ABSTRACT

There is provided a hydrogen peroxide removal equipment which has a high capability for removing hydrogen peroxide and is able to cope with variation in amount of a hydrogen peroxide containing waste water and variation of a hydrogen peroxide concentration occurring in a semiconductor plant. A tank 51 is internally provided with a first decomposition section 16, a second decomposition section 17 and a third decomposition section 8 which are constituted by combining a charcoal 9 and a plastic material 10 having a void capable of allowing water and gas to pass therethrough. The first and second decomposition sections 16 and 17 are provided below the level of an outlet port 42 and arranged on both sides of a vertical partition plate 13 located apart from a bottom plate 51E. The third decomposition section 8 is provided above the level of the outlet port 42 and arranged above the first and second decomposition sections 16 and 17. A gas discharging section 12 which discharges a gas upwardly from below the first decomposition section 16 and a water sprinkling device 18 which pumps up a waste water in the tank 51 and sprinkles the same on the third decomposition section 8 are provided.

11 Claims, 5 Drawing Sheets

HYDROGEN PEROXIDE REMOVAL EQUIPMENT CAPABLE OF TREATING BOTH WASTE WATER AND WASTE GAS

BACKGROUND OF THE INVENTION

1. Field of the Invention

The present invention relates to a hydrogen peroxide removal equipment for treating a waste water containing hydrogen peroxide. The present invention also relates to a hydrogen peroxide removal equipment capable of treating a waste gas containing an organic substance together with the waste water containing hydrogen peroxide.

2. Description of the Prior Art

When hydrogen peroxide is contained in the waste water, COD (Chemical Oxygen Demand) increases. Therefore, it is required to surely remove the hydrogen peroxide in the waste water. Furthermore, when the hydrogen peroxide is untreated in a waste water treating process of a fluorine containing waste water, minute bubbles of oxygen generated from the hydrogen peroxide adhere to a flock of sedimentation in a coagulation-sedimentation process to hinder the sedimentation itself, consequently degrading the treated water. Therefore, in the waste water treating process, the hydrogen peroxide containing waste water is treated separately from the general coagulation-sedimentation process.

Conventionally, as a hydrogen peroxide removal equipment for removing the hydrogen peroxide in the waste water, an equipment as shown in FIG. 5 has been known (Japanese Patent Laid-Open Publication No. HEI 6-91258). This hydrogen peroxide removal equipment 70 has in its treatment tank 33 a contact section 111 which is defined by a wire gauze 105 and a peripheral wall 106 and is opening upwardly and a sedimentation section 112 which surrounds the contact section 111 via the peripheral wall 106. Downwardly around the contact section 111 are provided an opening 116 for making the sedimentation section 112 communicate with the contact section 111 and a supply port 104 for letting the waste water horizontally flow into the contact section 111. In operation, a granular activated carbon is preparatorily put into the contact section 111 at a rate of 1 to 35% of the effective tank capacity. In this state, the hydrogen peroxide containing waste water is introduced from a pipe 7A into the treatment tank 33 through a supply port 103 provided at the bottom of the tank. This hydrogen peroxide containing waste water flows into the contact section 111 through the wire gauze 105 to fill the contact section 111 therewith. On the other hand, the hydrogen peroxide containing waste water (of which flow rate is adjusted by a valve 120) is introduced into the contact section 111 from a branched pipe 7B through the horizontal supply port 104. As a result, an eddying current is generated together with an ascending current inside the contact section 111, and the granular activated carbon and the hydrogen peroxide containing waste water are put in contact with each other, so that the hydrogen peroxide is decomposed into water and oxygen by a catalyzing effect of the activated carbon. The waste water obtained through the treatment process overflows from the contact section 111 to come into the sedimentation section 112, and then it is discharged from an outlet port 118 provided behind a baffle plate 117 through a pipe 21. In the present case, even when the granular activated carbon overflows together with the treated waste water to the sedimentation section 112, the granular activated carbon stays in the sedimentation section 112 for a time to settle there and then returns to the contact section 111 through the opening 106. Therefore, only a supernatant water is discharged from the outlet port 118 of the sedimentation section 112.

This type of hydrogen peroxide removal equipment is, as exemplarily shown in FIG. 4, often incorporated into a waste water treatment system 80 for treating the hydrogen peroxide containing waste water generated in a semiconductor plant 1. Generally, a production room 100 of the semiconductor plant 1 for producing ICs (Integrated Circuits) and the like is provided with a number of production equipments such as an equipment 37 for executing so-called the RCA cleaning process (a cleaning method developed by RCA Corp., typically consisting of a first stage for removing each organic substance by means of $NH_4OH$, HCl and $H_2O$ and a second stage for removing alkaline metals and heavy metals by means of HCl, $H_2O_2$ and $H_2O$) and an equipment 2 using organic solvents such as acetone and isopropyl alcohol. The hydrogen peroxide containing waste water from the RCA cleaning equipment 37 and so forth flows into a raw water tank 5 through a pipe 26, and the quantity and quality of the water are adjusted to a certain degree in the raw water tank 5. Subsequently, the waste water is introduced into a hydrogen peroxide removal equipment 70 through a pipe 7 by a raw water tank pump 6. In the tank 33 of the hydrogen peroxide removal equipment 70, the hydrogen peroxide in the waste water is decomposed into oxygen and water as described hereinbefore. Then, the waste water obtained through the treatment process flows into a treated water tank 23 through the pipe 21. The quality of the water in the treated water tank 23 is inspected by an oxidation reduction electrometer 34.

Further, as shown in FIG. 4, a waste gas containing any organic substance (organic substance containing waste gas) from the RCA cleaning equipment 37, the organic solvent using equipment 2 and so forth is treated by a treatment system 90 for the organic substance containing waste gas separately from the waste water treatment system 80 for the hydrogen peroxide containing waste water. That is, the organic substance containing waste gas 27 is generated from the organic solvent using equipment 2, the RCA cleaning equipment 37 and so forth of the production room 100, discharged by a production room exhaust fan 35 provided outside the production room 100, and then introduced via an exhaust duct 36A into activated carbon adsorption towers 32A and 32B. Then, each organic substance contained in the waste gas is adsorbed on the activated carbon stuffed in the activated carbon adsorption towers 32A and 32B, so that each organic substance is removed from the waste gas. It is to be noted that the organic substance adsorption process is not intended to decompose each organic substance, and therefore, when the amount of each organic substance that is adsorbed on the activated carbon reaches an adsorption saturation amount, it is required to desorb each organic substance from the activated carbon. Therefore, normally two or more activated carbon adsorption towers are provided, and by repeating the adsorption and desorption alternately in the activated carbon adsorption towers 32A and 32B, the organic substance containing waste gas is continuously treated as a whole. Each desorbed organic substance is collected through an exhaust duct 36B or further treated in a waste water treating equipment.

The quantity and quality of the hydrogen peroxide containing waste water generated in the semiconductor plant 1 vary greatly depending on the day and time. This is because the semiconductor plant 1 has a number of production equipments such as the RCA cleaning equipment 37 and the organic solvent using equipment 2, and on the convenience of the production process, chemicals or the like containing hydrogen peroxide are used irregularly in time. Furthermore, when sterilizing and cleaning the production equipments with hydrogen peroxide, a great amount of hydrogen peroxide containing waste water is generated. Therefore, if the quantity and quality of the hydrogen peroxide containing waste water are adjusted to a certain extent in the raw water tank 5, the waste water flowing into the hydrogen peroxide removal equipment 70 greatly increases in amount, and the resulting hydrogen peroxide concentration sometimes greatly increases.

However, the hydrogen peroxide removal equipment 70 has such a problem that it can hardly cope with the increase in amount of the hydrogen peroxide containing waste water and the increase of the hydrogen peroxide concentration. The reason of the above is as follows. That is, a specified amount of granular activated carbon is merely made to circulate with the eddying current in the same direction as that of the waste water, and therefore, the granular activated carbon cannot be uniformly distributed throughout the entire inner region of a tank 111. Furthermore, since there is a small variation of the contact surfaces of the granular activated carbon and the waste water, there is a low capacity for removing the hydrogen peroxide.

Generally speaking, there is an operational technique to limit the amount of inflow water when the quality of the inflow waste water is worsened (when the hydrogen peroxide concentration is increased in this case) in the waste water treating equipment. However, when the amount of inflow water is limited in the prior art hydrogen peroxide removal equipment 70, a reduced stirring force results inside the tank 111 to cause sedimentation of the activated carbon on the bottom of the tank, and this reduces the function of the activated carbon as a catalyst. Furthermore, the semiconductor plant originally has the tendency that the increase in amount of the hydrogen peroxide containing waste water and the increase of the hydrogen peroxide concentration occur concurrently, and therefore, such an operational technique can hardly cope with the above matter in many cases.

SUMMARY OF THE INVENTION

The object of the present invention is therefore to provide a hydrogen peroxide removal equipment which has a high capacity for removing hydrogen peroxide and is able to cope with the variation in amount of the hydrogen peroxide containing waste water and the variation of the hydrogen peroxide concentration occurring in a semiconductor plant.

Furthermore, according to the prior art, the treatment system 90 for the organic substance containing waste gas is provided to treat the organic substance containing waste gas separately from the treatment system 80 for the hydrogen peroxide containing waste water. Therefore, expensive initial cost and running cost have been required, causing serious disadvantages in terms of control, installation space and so forth.

Accordingly, another object of the present invention is to provide a hydrogen peroxide removal equipment capable of treating the hydrogen peroxide containing waste water as well as the organic substance containing waste gas.

In order to achieve the aforementioned object, there is provided a hydrogen peroxide removal equipment which introduces a waste water through a supply port into a tank, decomposes hydrogen peroxide in the introduced waste water inside the tank, and discharges the waste water through an outlet port, comprising:

a first decomposition section, a second decomposition section and a third decomposition section constituted by combining a charcoal and a plastic material having a void for allowing water and gas to pass therethrough inside the tank, wherein the first decomposition section and the second decomposition section are provided below a water surface level of the waste water introduced into the tank and are arranged on both sides of a vertical partition plate located apart from a bottom plate of the tank, and the third decomposition section is provided above the water surface level of the waste water and is arranged above the first decomposition section and the second decomposition section;

a gas discharging section which upwardly discharges a gas from below the first decomposition section to generate in the waste water introduced into the tank a circulating current which flows over an upper end of the partition plate to reach the second decomposition section from the first decomposition section and returns from the second decomposition section to flow under a lower end of the partition plate to the first decomposition section; and a water sprinkling means for pumping up the waste water inside the tank and sprinkling the waste water on the third decomposition section.

In the hydrogen peroxide removal equipment of the present invention, the waste water is introduced into the tank to the level of, for example, the outlet port. The introduced waste water is circulated between the first decomposition section and the second decomposition section by the gas discharged from the gas discharging section, thereby forming a circulating current there. Then, the hydrogen peroxide in the waste water is put in contact with the charcoal in the first decomposition section and the second decomposition section to be consequently decomposed into water and oxygen gas with the charcoal used as a catalyst (primary treatment). Further, the waste water in the tank is pumped up and sprinkled on the third decomposition section by the water sprinkling means. The sprinkled waste water is put in contact with the charcoal in the third decomposition section while falling through the third decomposition section to be consequently decomposed into water and oxygen gas with the charcoal used as a catalyst (secondary treatment). The waste water that has fallen through the third decomposition section flows together with the circulating current formed between the first decomposition section and the second decomposition section. Thus, the waste water in the tank is subjected to the primary treatment in the first decomposition section and the second decomposition section and then to the secondary treatment in the third decomposition section. As a result, the capability of removing the hydrogen peroxide is enhanced, and the variation in amount of the hydrogen peroxide containing waste water and the variation of the hydrogen peroxide concentration occurring in the semiconductor plant can be satisfactorily dealt with. Therefore, the equipment control can be made easy.

In this hydrogen peroxide removal equipment, the charcoal constituting the first decomposition section, the second decomposition section and the third decomposition section is preferably implemented by bincho charcoal. In the present case, the bincho charcoal is a time-honored charcoal in Japan and means a hard charcoal of holm oak which is a broadleaf tree.

Bincho charcoal has a specific gravity of not smaller than one. Therefore, even when the first decomposition section and the second decomposition section are immersed in the waste water, the charcoal itself does not float. Furthermore, by selecting ones having an appropriate size of a length of not smaller than several centimeters from the bincho charcoal pieces availed on the market for use as the above charcoal, the charcoal pieces do neither move (without resulting in so-called dancing) nor damage themselves even when they are exposed to intense air blow of the gas discharged from the gas discharging section, the oxygen gas or the like generated through the decomposition of the hydrogen peroxide. Furthermore, even when the charcoal pieces are exposed to intense sprinkling of water in the third decomposition section, they are not damaged. Therefore, the structures of the first decomposition section, the second decomposition section and the third decomposition section are easily maintained. As a result, the cost of treating the hydrogen peroxide containing waste water is suppressed. In contrast to this, when the charcoal is an ordinary charcoal, its specific gravity is smaller than one. Therefore, the charcoal pieces themselves float on the water surface, and it is feared that the charcoal pieces may dance or damage themselves by the intense air blow.

In a hydrogen peroxide removal equipment of one embodiment, a granular or powdery activated carbon capable of flowing together with the waste water is put in the tank, and the first decomposition section, the second decomposition section and the third decomposition section are capable of allowing the activated carbon contained in the waste water to pass in a vertical direction.

In the hydrogen peroxide removal equipment of this embodiment, the activated carbon put in the tank circulates between the first decomposition section and the second decomposition section with the circulating current of the waste water and is pumped up together with the waste water to fall through the third decomposition section and then circulate. Consequently, the activated carbon passes through the first decomposition section, the second decomposition section and the third decomposition section together with the waste water. Therefore, by virtue of the multiplier effect of the charcoal put in the fixed state and the activated carbon which flows together with the waste water, the capability of decomposing the hydrogen peroxide can be remarkably improved. That is, in the case where the activated carbon is merely made to flow together with the waste water as in the prior art hydrogen peroxide removal equipment shown in FIG. 5, the displacement of the activated carbon relative to the waste water is comparatively small, and therefore, the displacement of the contact surfaces of the waste water and the activated carbon is small. However, in the hydrogen peroxide removal equipment of the present embodiment, by the charcoal and the plastic material which constitute the decomposition sections as put in the fixed states, the waste water passing therethrough is stirred. Therefore, the displacement of the activated carbon relative to the waste water becomes greater to increase the displacement of the contact surfaces of the waste water and the activated carbon, so that the hydrogen peroxide in the waste water is decomposed much in amount by the activated carbon. That is, by virtue of not only the decomposing capability of the charcoal in the fixed state in cooperation with the decomposing capability of the activated carbon that merely flows together with the waste water but also the improvement of the decomposing capability of the activated carbon as a consequence of the stirring of the waste water by the charcoal and the like in the fixed state, the hydrogen peroxide is decomposed more in amount. When a surface active agent exists in the waste water, the activated carbon tends to gather and coagulate (in this case, the capability of decomposing the hydrogen peroxide is reduced), however, such a gathering of the activated carbon is destroyed by the discharge of the gas from the gas discharging section. Therefore, even when the surface active agent exists in the waste water, the capability of decomposing the hydrogen peroxide is not reduced.

In a hydrogen peroxide removal equipment of one embodiment, the first decomposition section, the second decomposition section and the third decomposition section are constituted by alternately laminating in a vertical direction a charcoal layer in which pieces of the charcoal are arranged horizontally with space for allowing water and gas to pass therethrough and a plastic material layer in which pieces of the plastic material are arranged horizontally.

In the hydrogen peroxide removal equipment of this embodiment, the water and gas are made to smoothly pass. Furthermore, when the waste water passes through the first decomposition section, the second decomposition section and the third decomposition section in the vertical direction, the frequency of contact of the waste water with the charcoal increases. Therefore, the capability of decomposing the hydrogen peroxide in the waste water is further improved.

In a hydrogen peroxide removal equipment of one embodiment, an inner wall located apart from the bottom plate of the tank is provided on a side opposite to the partition plate with respect to the second decomposition section, and an outer wall which continues from the bottom plate of the tank and has an outlet port is provided outside the inner wall, thereby forming between the inner wall and the outer wall an activated carbon sedimentation section for allowing the activated carbon in the waste water to settle.

In the hydrogen peroxide removal equipment of this embodiment, the activated carbon in the waste water surely settles in the activated carbon sedimentation section. Consequently, the activated carbon does not flow out of the outlet port, and only the supernatant water flows out. Therefore, the quality of the treated water that is flowing out of the outlet port is assured. It is to be noted that the activated carbon that has settled in the activated carbon sedimentation section flows together with the circulating current formed between the first decomposition section and the second decomposition section.

In a hydrogen peroxide removal equipment of one embodiment, a portion which belongs to the bottom plate of the tank and is located below the activated carbon sedimentation section and the second decomposition section is inclined downward toward the first decomposition section.

In the hydrogen peroxide removal equipment of this embodiment, the activated carbon that has passed through the second decomposition section together with the waste water and reached a position below the second decomposition section as well as the activated carbon that has settled in the activated carbon sedimentation section easily move to the first decomposition section side by the gravity exerted along the slope of the bottom plate of the tank in addition to the force exerted from the circulating current of the waste water. In detail, the activated carbon moves along the slope of the bottom plate of the tank through the space between the inner wall and the bottom plate as well as the space between the partition plate and the bottom plate to the first decomposition section side, and then flows together with the circulating current of the waste water that is passing through the first decomposition section and the second decomposition section. Therefore, the activated carbon put in the tank circulates throughout the entire inner region of the tank without staying in a specific position, thereby effectively decomposing the hydrogen peroxide in the waste water.

In a hydrogen peroxide removal equipment of one embodiment, the water sprinkling means has an air lift pump for pumping up the waste water through a pipe which extends from a position below the water surface level of the waste water to a position above the third decomposition section, there are provided an oxidation reduction electrometer in the activated carbon sedimentation section, and a control section for controlling a pumping amount of the air lift pump according to an oxidation reduction electric potential of the waste water detected by the oxidation reduction electrometer.

In the hydrogen peroxide removal equipment of this embodiment, the control section controls the pumping amount of the air lift pump according to the oxidation reduction electric potential of the waste water in the activated carbon sedimentation section. For example, when the amount of the hydrogen peroxide containing waste water introduced into the tank is increased to increase the hydrogen peroxide concentration in the activated carbon sedimentation section, the control section increases the pumping amount of the air lift pump according to the increase of the hydrogen peroxide concentration. In the present case, the amount of circulating water passing through the third decomposition section increases, and the waste water that has passed through the second decomposition section is pumped up, and therefore, the amount of water circulating between the first decomposition section and the second decomposition section increases. As a result, the capability of decomposing the hydrogen peroxide is improved, and the control is executed so that the hydrogen peroxide concentration in the waste water in the tank reduces. This control is automatically executed without manual assistance, and therefore, the hydrogen peroxide concentration rapidly reduces. When the hydrogen peroxide concentration in the activated carbon sedimentation section is reduced as a consequence of the reduction in amount of the hydrogen peroxide containing waste water introduced into the tank, the control section reduces the pumping amount of the air lift pump according to the reduction of the hydrogen peroxide concentration. As a result, the amount of work of the air lift pump is allowed to be small, and the energy is saved accordingly. Therefore, the variation in amount of the hydrogen peroxide containing waste water and the variation of the hydrogen peroxide concentration occurring in the semiconductor plant can be dealt with speedily and economically, so that the equipment control is made easier.

In a hydrogen peroxide removal equipment of one embodiment, the gas discharging section comprises a gas diffusing pipe which is arranged below the first decomposition section and has holes for discharging a gas, and a pipe for supplying an organic substance containing waste gas through the wall surface of the tank is connected to the gas diffusing pipe.

In the hydrogen peroxide removal equipment of this embodiment, the hydrogen peroxide containing waste water can be treated similarly to the hydrogen peroxide removal equipment of the embodiment stated hereinbefore, and further the organic substance containing waste gas can be treated as follows. That is, according to the hydrogen peroxide removal equipment of this embodiment, for example, a pipe for supplying the organic substance containing waste gas discharged from the semiconductor plant is connected to the gas diffusing pipe arranged below the first decomposition section. The organic substance containing waste gas is discharged upwardly into the waste water from the gas diffusing pipe to generate a circulating current between the first decomposition section and the second decomposition section, and the gas itself passes through the first decomposition section. While passing through the first decomposition section, each organic substance in the waste gas is oxidated by the hydrogen peroxide in the waste water and the oxygen gas generated through the decomposition of the hydrogen peroxide. Further, each organic substance in the waste gas is adsorbed on the charcoal that constitutes the first decomposition section. On the other hand, by virtue of the space provided at the plastic material that constitutes the first decomposition section, the waste gas and the waste water are efficiently put in contact with each other, so that each organic substance in the waste gas is efficiently dissolved in the waste water. Therefore, each organic substance is also oxidated by the hydrogen peroxide in the waste water and the oxygen gas generated through the decomposition of the hydrogen peroxide, as dissolved in the waste water. Thus the organic substance containing waste gas is chemically treated in the first decomposition section (primary treatment). Then, the waste gas obtained through the primary treatment passes through the third decomposition section located above the first decomposition section. While passing through the third decomposition section, each organic substance remaining in the waste gas is oxidated by the oxygen gas generated through the decomposition of the hydrogen peroxide in the waste water located below. Further, each organic substance remaining in the waste gas is adsorbed on the charcoal that constitutes the third decomposition section. On the other hand, by virtue of the existence of the space provided at the plastic material that constitutes the third decomposition section, the waste gas and the waste water are efficiently put in contact with each other, so that each organic substance remaining in the waste gas is efficiently dissolved in the waste water. Therefore, each organic substance is also oxidated by the hydrogen peroxide in the waste water and the oxygen gas generated through the decomposition of the hydrogen peroxide, as dissolved in the waste water. Thus the organic substance containing waste gas is further chemically treated in the third decomposition section (secondary treatment). Furthermore, in the third decomposition section, the hydrogen peroxide has been already decomposed to a certain extent, and therefore, the hydrogen peroxide influences less than in the first decomposition section. Therefore, microbes are generated to a certain extent to be able to increase there. Such microbes are useful for treating each organic substance contained in the waste gas.

As described above, the hydrogen peroxide removal equipment of this embodiment can treat the hydrogen peroxide containing waste water as well as the organic substance containing waste gas. Therefore, in contrast to the case where those treatment processes are executed in separate systems, the initial cost and the running cost can be reduced. Furthermore, the variation in amount of the hydrogen peroxide containing waste water and the variation of the hydrogen peroxide concentration occurring in the semiconductor plant can be satisfactorily dealt with, thereby allowing the equipment control to be easy. Furthermore, the installation space of the equipment can be saved.

Particularly when a granular or powdery activated carbon is put in the tank, the flowing activated carbon adsorbs thereon each organic substance in the waste gas, and subsequently each organic substance is oxidated by the oxygen gas generated. Furthermore, in the third decomposition section, the waste water containing the activated carbon is sprinkled. Therefore, each organic substance in the waste gas receives not only the effect of absorption thereof into the waste water through the contact of gas with liquid but also the effect of adsorption thereof on the flowing activated carbon in addition to the effect of absorption thereof into the waste water through the contact of gas with liquid. Consequently, each organic substance can be effectively treated. In detail, the activated carbon in the tank initially operates as a catalyst for decomposing the hydrogen peroxide. Then, the activated carbon adsorbs each organic substance on its surface, and each organic substance is oxidated by the oxygen gas generated through the decomposition of the hydrogen peroxide, so that the activated carbon exposes its new surface. Then, the activated carbon operates again as a catalyst for decomposing the hydrogen peroxide and adsorbs each organic substance on its surface. Thus, the activated carbon in the tank operates by repeating the series of cycles. Therefore, it is not required to take the trouble of providing two or more activated carbon adsorption towers and alternately executing the adsorption and desorption as in the prior art shown in FIG. 4, thereby allowing the equipment control to be much easier.

Particularly when the first decomposition section and the third decomposition section are constituted by alternately laminating a charcoal layer and a plastic material layer in the vertical direction, the waste gas passing through the first decomposition section and the third decomposition section moves upwardly uniformly in the horizontal direction. Therefore, the first decomposition section and the third decomposition section fully function to efficiently treat each organic substance in the waste gas.

In a hydrogen peroxide removal equipment of one embodiment, an equalizing plate formed with a plurality of dispersedly arranged through holes capable of allowing the water, gas and activated carbon to pass therethrough is provided horizontally below the third decomposition section and above the water surface level of the waste water.

In the hydrogen peroxide removal equipment of this embodiment, the waste gas and the oxygen gas that have moved upwardly through the first decomposition section are diffused uniformly in the horizontal direction by the equalizing plate. As a result, the waste gas and the oxygen gas move upwardly uniformly in the entire region of the third decomposition section. Therefore, the third decomposition section fully functions to efficiently treat each organic substance in the waste gas.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The hydrogen peroxide removal equipments of embodiments of the present invention will be described in detail below.

Figure 1:
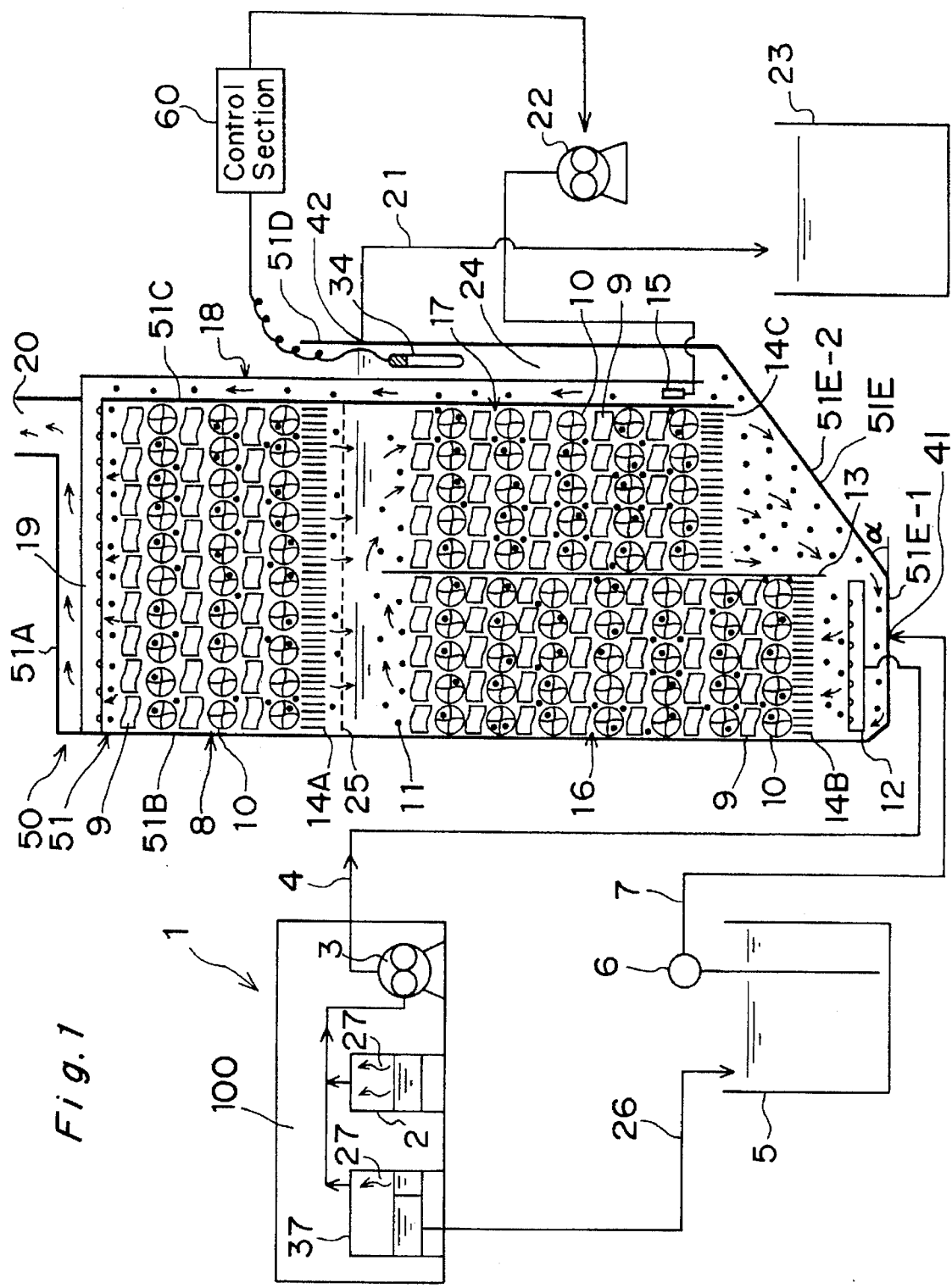
FIG. 1 is a diagram showing a waste water and waste gas treatment system using a hydrogen peroxide removal equipment of the present invention.

FIG. 1 shows a state of a hydrogen peroxide removal equipment 50 according to an embodiment of the present invention installed outside a production room 100 of a semiconductor plant 1.

The present hydrogen peroxide removal equipment 50 is provided with an approximately rectangular parallelopiped tank 51 for simultaneously treating a waste water which contains hydrogen peroxide and is introduced through a supply port 41 and a waste gas which contains an organic substance and is introduced through a pipe 4. The tank 51 dimensionally has, for example, a height of about 2 m and a horizontally sectional area of about 1 m square.

The tank 51 has a top plate 51A provided with an exhaust duct 20, a bottom plate 51E provided with a waste water supply port 41, a left side plate 51B which connects the top plate 51A with the bottom plate 51E, a right side plate 51C which serves as an inner wall and a right side plate 51D which has a height about a half of that of the right side plate 51C serving as an outer wall and is upwardly provided with a waste water outlet port 42 (for the sake of simplicity, front and rear plates are not shown). An approximately left half portion of the bottom plate 51E is a flat section 51E-1, while an approximately right half portion of the bottom plate 51E is a sloped section 51E-2 which inclines at an angle α relative to the horizontal direction. An upper end of the right side plate 51C is connected to the top plate 51A, while a lower end of the right side plate 51C is located apart from the sloped section 51E-2 of the bottom plate 51E. Further, a lower end of the right side plate 51D is connected to an upper end of the sloped section 51E-2 of the bottom plate 51E. An exhaust duct 20, the waste water supply port 41 and the waste water outlet port 42 are provided on the right hand side of the top plate 51A, at the flat section 51E-1 of the bottom plate 51E and at an upper portion of the right side plate 51D, respectively.

Into the tank 51 is inserted a granular or powdery activated carbon 11 which can flow together with the waste water. The activated carbon 11 operates as a catalyst for decomposing the hydrogen peroxide in the waste water into water and oxygen gas similarly to the charcoal, and provides the effect of adsorbing each organic substance in the waste gas introduced into the tank 51.

Inside the tank 51 is provided a vertical partition plate 13 which internally partitions the tank into a left half and a right half below the level of the outlet port 42. An upper end of the partition plate 13 is located slightly below the level of the outlet port 42, while a lower end of the partition plate 13 is located apart from the bottom plate 51E. It is to be noted that the material of the partition plate 13 is not specifically limited, and it may be made of steel, resin or concrete.

Grid plates 14B and 14C are horizontally extended between the proximity of the lower end of the partition plate 13 and the corresponding portion of the left side plate 51B and between the proximity of the lower end of the right side plate 51C and the corresponding portion of the partition plate 13, respectively. A first decomposition section 16 and a second decomposition section 17 for decomposing the hydrogen peroxide in the waste water are provided on the grid plates 14B and 14C and below the level of the outlet port 42. Further, a grid plate 14A is horizontally extended between the left side plate 51B and the right side plate 51C and above the level of the outlet port 42. The third decomposition section 8 for decomposing the hydrogen peroxide in the waste water is provided on the grid plate 14A with a space provided between it and the top plate 51A.

The grid plates 14B, 14C and 14A are each assembled into a grid form within a horizontal plane by arranging plate materials having specified length, width and thickness (length>width>thickness) with their lengthwise direction directed in the horizontal direction and with their widthwise direction directed in the vertical direction. Since the widthwise direction of the plate materials is directed in the vertical direction, the grid plates 14B, 14C and 14A can support the decomposition sections 16, 17 and 8 with a relatively great strength. Further, each of the grid plates 14B, 14C and 14A has a relatively small projection area in the vertical direction, and therefore, the waste water and the waste gas are allowed to smoothly pass therethrough in the vertical direction.

The first decomposition section 16, the second decomposition section 17 and the third decomposition section 8 are each constituted by alternately laminating a charcoal layer and a plastic material layer in the vertical direction. The charcoal layer is a layer in which a plurality of approximately cylindrical charcoal pieces 9 are arranged horizontally with a space for allowing the activated carbons 11 to pass therethrough. The charcoal piece 9 allows water and gas to pass therethrough. On the other hand, the plastic material layer is a layer in which plastic material pieces 10 are arranged horizontally. The plastic material pieces 10 have clearances for allowing water, gas and the activated carbon 11 to pass therethrough.

The charcoal 9 functions as a catalyst for decomposing the hydrogen peroxide in the waste water into water and oxygen gas. In the present case, the charcoal 9 is implemented by bincho charcoal. The bincho charcoal is a time-honored charcoal in Japan, and means a hard charcoal of holm oak which is a broadleaf tree. The bincho charcoal has a specific gravity of not smaller than one. Therefore, even when the first decomposition section 16 and the second decomposition section 17 are immersed in the waste water, the charcoal pieces do not float. In regard to the size of the bincho charcoal, it is preferable to select ones each having a diameter of 4 to 6 cm and a length of not smaller than 5 cm. By this selection, the charcoal pieces 9 do neither move around (so-called dancing does not occur) nor damage themselves even when they are exposed to intense air blow. Furthermore, even when they are exposed to intense sprinkle of water in the third decomposition section 8, they are not damaged. Therefore, the structures of the first decomposition section 16, the second decomposition section 17 and the third decomposition section 8 can be easily maintained, thereby allowing the waste water and the waste gas to be satisfactorily stirred. It is to be noted that though there are bincho charcoal pieces having various sizes on the market, those having a maximum length of about 7 to 8 cm are also availed. Therefore, it is easy to select the appropriate charcoal pieces.

On the other hand, it is practically proper for the plastic material 10 to select Raschig ring, Berl saddle, intalox saddle, Terralet, paul ring or the like. These are used in general waste gas treating equipments and have a relatively small air resistance.

The decomposition sections 16, 17 and 8 are constructed by alternately laminating the charcoal layer and the plastic material layer in the vertical direction as described hereinbefore, and therefore, they allow water and gas to smoothly pass therethrough. Furthermore, when the waste water passes through the decomposition sections 16, 17 and 8, an increased frequency of contact of the waste water with the charcoal pieces can be assured. Therefore, the capability of decomposing the hydrogen peroxide in the waste water can be improved. Furthermore, when the waste gas passes through the first decomposition section 16 and the third decomposition section 8, the gas diffuses in the horizontal direction in each plastic material layer and moves upwardly uniformly in the horizontal direction. Therefore, the first decomposition section 16 and the third decomposition section 8 fully function to efficiently decompose each organic substance in the waste gas.

In the tank 51, a gas diffusing pipe 12 having a plurality of holes for gas discharging use is horizontally provided as a gas discharging section above the flat section 51E-1 of the bottom plate 51E below the first decomposition section 16 and the grid plate 14B which supports it. In order to discharge the gas toward the first decomposition section 16 located above uniformly in the horizontal direction, a plurality of gas diffusing pipes 12 are arranged in parallel with one another in the depthwise direction in FIG. 1. The gas diffusing pipes 12 discharge upwardly the gas supplied from outside the tank 51, i.e., the organic substance containing waste gas in this example. By this operation, a circulating current which starts from the first decomposition section 16 to flow over the upper end of the partition plate 13 to reach the second decomposition section 17 and returns from the second decomposition section 17 to flow under the lower end of the partition plate 13 to the first decomposition section 16 is formed in the waste water introduced into the tank 51. Since the partition plate 13 is internally partitioning the tank 51, the resulting ascending current in the first decomposition section 16 and the resulting descending current in the second decomposition section 17 do not interfere with each other. Consequently, the above circulating current is efficiently generated.

An angle $\alpha$ of the sloped section 51E-2 of the bottom plate 51E of the tank 51, which depends on the type of the selected activated carbon 11, is allowed to be approximately 30 degrees or more in order to move the activated carbon 11 that comes below the second decomposition section 17 gradually toward the first decomposition section 16. The activated carbon 11 that has moved along the sloped section 51E-2 to the first decomposition section 16 side by a force exerted from the circulating current and the gravity can move upwardly together with the waste water inside the first decomposition section 16 by the ascending current of the waste gas discharged from the gas diffusing pipe 12.

Further, an equalizing plate 25 is provided horizontally below the third decomposition section 8 and above the level of the outlet port 42. The equalizing plate 25 has its surface formed with a plurality of dispersedly arranged through holes capable of allowing water, gas and the activated carbon 11 to pass therethrough. The equalizing plate 25 is to uniformly distribute the organic substance containing waste gas and the oxygen gas generated through the decomposition of the hydrogen peroxide which have moved upwardly from the first decomposition section 16 and the second decomposition section 17 located below to the third decomposition section 8 as far as possible.

A section 24 between the right side plates 51C and 51D of the tank 51 operates as an activated carbon sedimentation section. That is, the activated carbon sedimentation section 24 is merely communicated with a portion on the left hand side of the right side plate 51C of the inside of the tank 51 via a space between the lower end of the right side plate 51C and the sloped section 51E-2 of the bottom plate 51E, and therefore, it is influenced less by the waste water. Therefore, before the waste water is discharged through the outlet port 42, the activated carbon 11 in the waste water is allowed to settle in this activated carbon sedimentation section 24. It is to be noted that the time of stay of the waste water in the activated carbon sedimentation section 24 is preferably not shorter than one hour with respect to the amount of inflow water.

Along the right side plate 51C, an air lift pump 18 is provided as a water sprinkling means for pumping up the waste water in the tank 51 and sprinkling the water on the third decomposition section 8. The air lift pump 18 is comprised of an L-shaped water sprinkling pipe 19 and an air diffusing pipe 15 stored in a lower portion (the leading end of the L shape) of the water sprinkling pipe 19. The water sprinkling pipe 19 extends upwardly from a lower portion of the activated carbon sedimentation section 24 along the right side plate 51C, bends in the vicinity of the top plate 51A, penetrates the right side plate 51C, extends horizontally above the third decomposition section 8 to reach the left side plate 51B, and connects with the left side plate 51B there. At a lower surface of the horizontal section (the section between the left side plate 51B and the right side plate 51C) of the water sprinkling pipe 19 is provided a plurality of holes for sprinkling the waste water containing the activated carbon 11. In order to sprinkle the water uniformly on the third decomposition section 8, a plurality of water sprinkling pipes 19 are provided in parallel with one another in the depthwise direction in FIG. 1. The air diffusing pipe 15 discharges upwardly air supplied from an air lift use blower 22 outside the tank 51 at a lower portion of the water sprinkling pipes 19. With this air flow, the waste water containing the activated carbon 11 is pumped up from below the activated carbon sedimentation section 24 and then sprinkled on the third decomposition section 8. In the present stage, a greater part of the activated carbon 11 that has settled in the activated carbon sedimentation section 24 are pumped up together with the waste water, and therefore, the waste water containing a relatively great amount of activated carbon 11 can be supplied onto the third decomposition section 8.

The reference numeral 100 denotes a production room, which means the production room 100 as a production site in the semiconductor plant 1. The production room 100 is internally provided with the organic substance using production equipment 2, the RCA cleaning equipment 37 and so forth. The RCA cleaning equipment 37 is a representative cleaning equipment for cleaning wafers, and uses a chemical which contains hydrogen peroxide. Further, as an organic substance using production equipment in a semiconductor plant 1, there is an organic solvent using production equipment, which is represented by a production equipment using isopropyl alcohol and acetone. In the present semiconductor plant 1, a variety of organic substance using production equipments (not shown) are used other than the above equipments. Inside the production room 100 is installed a production room waste gas blower 3. The production room waste gas blower 3 draws in by suction organic substance containing waste gases 27 generated from the organic solvent using production equipment 2 and the RCA cleaning equipment 37, and supplies the gases via the waste gas pipe 4 to the gas diffusing pipe 12 provided below the first decomposition section 16 inside the tank 51. The organic substance containing waste gas is discharged upwardly from the gas diffusing pipe 12. The reason why the waste gas blower 3 is installed instead of a ventilation fan is that such a blower having a high waste gas discharging ability is necessary for the purpose of discharging the organic substance containing waste gas from below the first decomposition section 16 located at a considerable depth in water. The type of the waste gas blower 3 is allowed to be selected according to the depth in water of the gas diffusing pipe 12.

The amount of organic substance containing waste gas discharged from the gas diffusing pipe 12 differs depending on the organic substance concentration, and when the stirring efficiency by the waste gas is taken into consideration, it is appropriate to set the amount to $50M^3$ a day per $1M^3$ of the volume of the first decomposition section 16. Basically, it is preferable to determine the amount depending on the organic substance concentration in the waste gas. That is, the amount of waste gas is also the gas volume for generating an ascending current in the first decomposition section 16 and treating the organic substance in the waste gas.

The hydrogen peroxide containing waste water (including ammonia and hydrochloric acid) from the RCA cleaning equipment 37 and so forth of the production room 100 flows into the raw water tank 5 through the pipe 26 and then stay in the raw water tank 5 for about 4 to 12 hours to adjust the quantity and quality of the water to a certain extent. The waste water whose quantity and quality have been adjusted in the raw water tank 5 is pumped up by the raw water tank pump 6 and then introduced via the pipe 7 into the tank 51 through the supply port 41. The raw water tank pump 6 is preferably designed so that it allows the hydrogen peroxide containing waste water inside the raw water tank 5 to be pumped up into the tank 51 taking a time of 20 to 22 hours a day.

When the hydrogen peroxide removal equipment 50 is operating, the waste water is introduced into the tank 51 to the level of the outlet port 42. The introduced waste water is circulated between the first decomposition section 16 and the second decomposition section 17 by the waste gas discharged from the gas diffusing pipe 12, thereby generating a circulating current there. Then, the hydrogen peroxide in the waste water is put in contact with the charcoal 9 in the first decomposition section 16 and the second decomposition section 17, where the hydrogen peroxide is decomposed into water and oxygen gas with the charcoal used as a catalyst (primary treatment). Further, the waste water inside the tank 51 is pumped up by the air lift pump 18 and then sprinkled on the third decomposition section 8. The sprinkled waste water is put in contact with the charcoal 9 in the third decomposition section 8 while falling through the third decomposition section 8, where the hydrogen peroxide is decomposed into water and oxygen gas with the charcoal 9 used as a catalyst (secondary treatment). The waste water that has fallen through the third decomposition section 8 flows together with the circulating current formed between the first decomposition section 16 and the second decomposition section 17. Thus, the waste water inside the tank 51 is subjected to the primary treatment in the first decomposition section 16 and the second decomposition section 17 and then to the secondary treatment in the third decomposition section 8. As a result, the capability of removing the hydrogen peroxide is improved to allow the equipment to be able to cope with the variation in amount of the hydrogen peroxide containing waste water and the variation of hydrogen peroxide concentration occurring in the semiconductor plant 1. Therefore, the equipment control is made easy.

Furthermore, the activated carbon 11 put in the tank 51 circulates with the circulating current of the waste water between the first decomposition section 16 and the second decomposition section 17 and is pumped up together with the waste water to fall through the third decomposition section 8 and then circulate. Consequently, the activated carbon 11 passes through the first decomposition section 16, the second decomposition section 17 and the third decomposition section 8 together with the waste water. Therefore, by the multiplier effect of the charcoal 9 put in the fixed state and the activated carbon 11 that moves together with the waste water, the capability of decomposing the hydrogen peroxide can be remarkably improved. That is, by the charcoal 9 and the plastic material 10 which are put in the fixed states and constitute the decomposition sections 16, 17 and 8, the waste water which passes therethrough is stirred. Therefore, the displacement of the activated carbon 11 relative to the waste water can be made greater to increase the displacement of the contact surfaces of the waste water and the activated carbon 11, so that the hydrogen peroxide in the waste water can be decomposed more in amount by the activated carbon 11.

In the vicinity of the outlet port 42 inside the activated carbon sedimentation section 24 is provided an oxidation reduction electrometer 34 for measuring the hydrogen peroxide concentration in the waste water. A control section 60 controls by an inverter the air lift use blower 22 according to the oxidation reduction electric potential of the waste water detected by the oxidation reduction electrometer 34. That is, when the hydrogen peroxide concentration detected by the oxidation reduction electrometer 34 increases above a predetermined upper reference value, the control section 60 increases the number of revolution of the air lift use blower 22 to increase the discharge air amount. When the discharge air amount of the blower 22 is increased, the amount of air flow from the air lift use air diffusing pipe 15 increases to increase the pumping amount of the air lift pump 18. Consequently, the amount of circulating water passing through the third decomposition section 8 is increased, and the waste water that has passed through the second decomposition section 17 is pumped up. Therefore, the amount of the circulating water between the first decomposition section 16 and the second decomposition section 17 is increased. As a result, the capability of decomposing the hydrogen peroxide is improved, and the control is executed so that the hydrogen peroxide concentration reduces. This control is automatically executed without manual assistance, so that the hydrogen peroxide concentration can be rapidly reduced. When the hydrogen peroxide concentration detected by the oxidation reduction electrometer 34 is reduced below a predetermined lower reference value, the control section 60 reduces the pumping amount of the air lift pump according to the reduction of the hydrogen peroxide concentration. As a result, the amount of work of the air lift pump is allowed to be small, and the energy is saved accordingly. By thus executing the control, the variation in amount of the hydrogen peroxide containing waste water and the variation of the hydrogen peroxide concentration occurring in the semiconductor plant 1 can be responded speedily and economically. Furthermore, the hydrogen peroxide removal equipment 50 can be more easily controlled.

The activated carbon 11 which flows together with the waste water settles in the activated carbon sedimentation section 24. Then, only the supernatant water overflows to flow from the outlet port 42 into a treated water tank 23 through the pipe 21.

On the other hand, the organic substance containing waste gas that is discharged upwardly from the gas diffusing pipe 12 generates the circulating current in the waste water inside the tank 51, and the waste gas itself passes through the first decomposition section 16. Since the first decomposition section 16 is constituted by alternately laminating the charcoal layer and the plastic material layer in the vertical direction, the waste gas passing through the first decomposition section 16 moves upwardly uniformly in the horizontal direction. While passing through first decomposition section 16, each organic substance in the waste gas is oxidated by the hydrogen peroxide in the waste water and the oxygen gas generated through the decomposition of the hydrogen peroxide. Further, each organic substance in the waste gas is adsorbed on the charcoal 9 that constitutes the first decomposition section 16. On the other hand, by virtue of the void of the plastic material 10 that constitutes the first decomposition section 16, the waste gas and the waste water are efficiently put in contact with each other, so that each organic substance in the waste gas is efficiently dissolved in the waste water. Therefore, each organic substance is also oxidated by the hydrogen peroxide in the waste water and the oxygen gas generated through the decomposition of the hydrogen peroxide, as dissolved in the waste water. Thus the organic substance containing waste gas is chemically treated in the first decomposition section 16 (primary treatment). Then, the waste gas obtained through the primary treatment moves upwardly together with the oxygen gas generated through the decomposition of the hydrogen peroxide to be diffused uniformly in the horizontal direction by the equalizing plate 25, and then enters the third decomposition section 8 in this state. Since the third decomposition section 8 is constituted by alternately laminating a charcoal layer and a plastic material layer in the vertical direction, the waste gas passing through the third decomposition section 8 moves upwardly uniformly in the horizontal direction. While passing through the third decomposition section 8, each organic substance remaining in the waste gas is oxidated by the oxygen gas generated through the decomposition of the hydrogen peroxide in the waste water located below. Further, each organic substance remaining in the waste gas is also adsorbed on the charcoal 9 that constitutes the third decomposition section 8. On the other hand, by virtue of the void of the plastic material 10 that constitutes the third decomposition section 8, the waste gas and the waste water are efficiently put in contact with each other, so that each organic substance remaining in the waste gas is efficiently dissolved in the waste water. Therefore, each organic substance is also oxidated by the hydrogen peroxide in the waste water and the oxygen gas generated through the decomposition of the hydrogen peroxide, as dissolved in the waste water. Thus the organic substance containing waste gas is further chemically treated in the third decomposition section 8 (secondary treatment).

Figure 4:
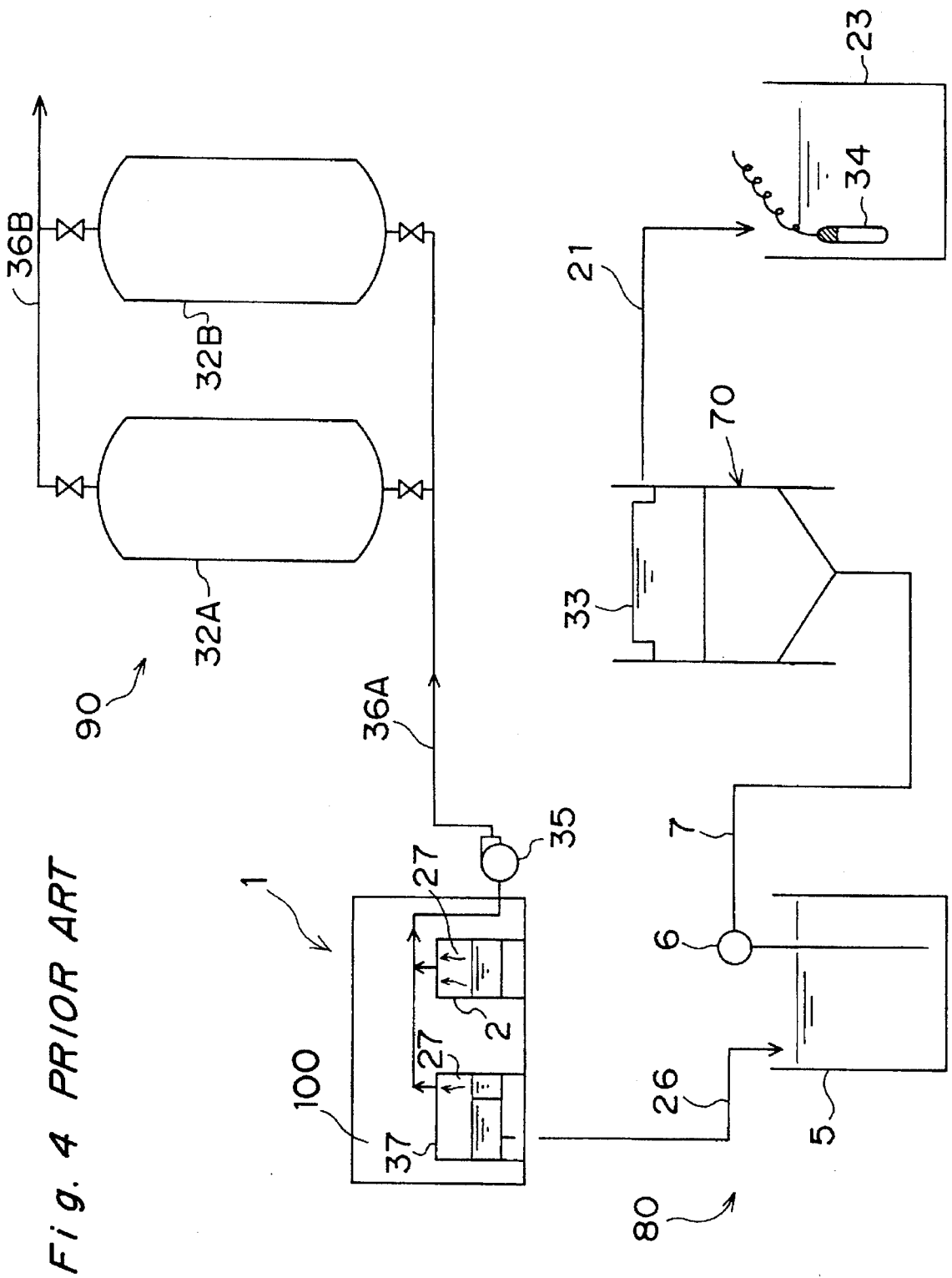
FIG. 4 is a diagram showing a waste water treatment system and a waste gas treatment system of a prior art.
Figure 5:
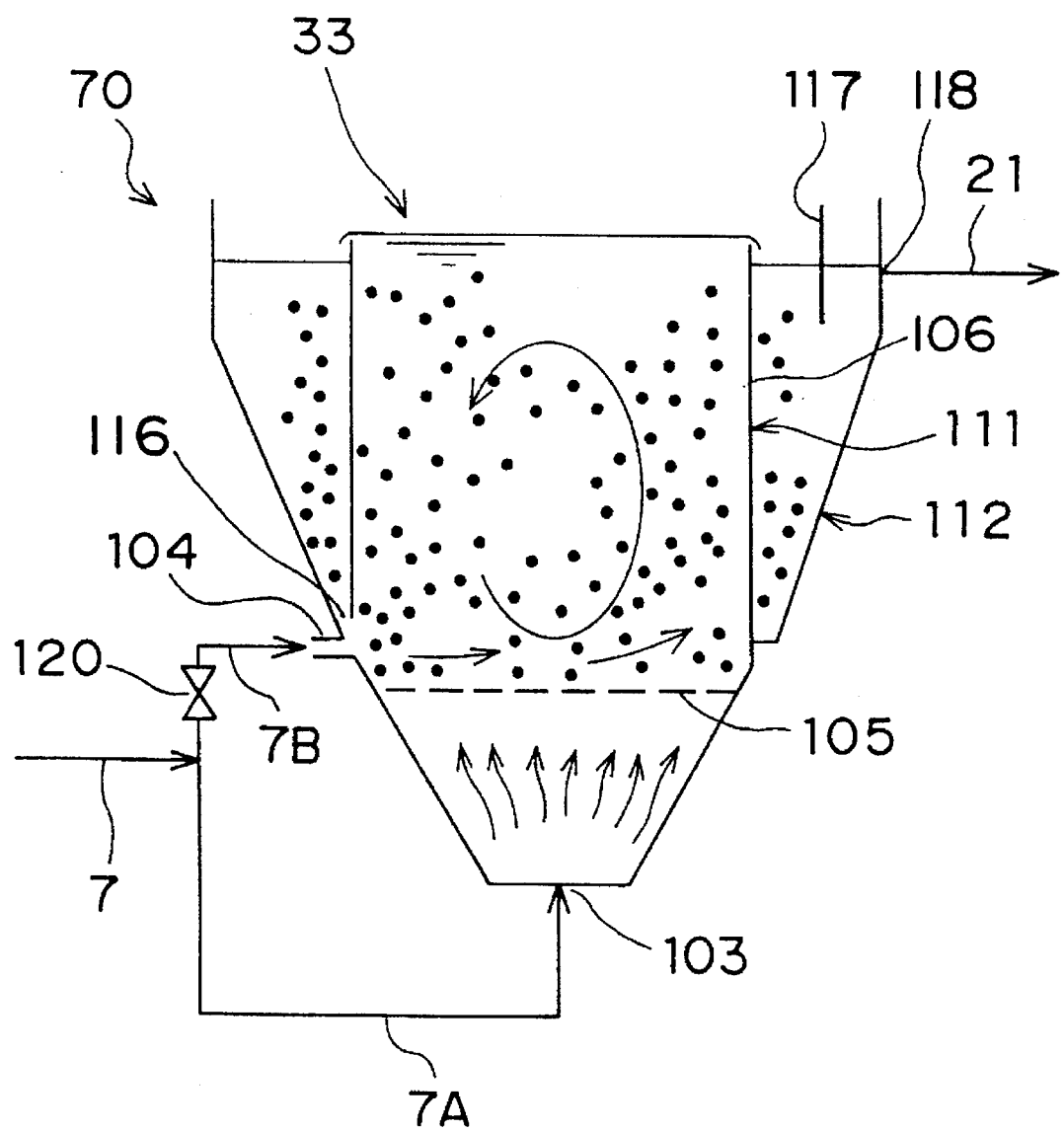
FIG. 5 is a diagram showing a prior art hydrogen peroxide removal equipment.

In particular, since the granular or powdery activated carbon 11 is put in the tank 51, the activated carbon 11 that flows in the first decomposition section 16 adsorbs each organic substance in the waste gas, and subsequently the organic substance is oxidated by the oxygen gas generated. Furthermore, in the third decomposition section 8, the waste water containing the activated carbon 11 is sprinkled thereon. Therefore, each organic substance in the waste gas receives both the effect of absorption thereof into the waste water through the contact of gas with liquid and the effect of adsorption thereof on the flowing activated carbon 11, unlike receiving only the effect of absorption thereof into the waste water through the contact of gas with liquid. Therefore, each organic substance can be effectively treated. In detail, the activated carbon 11 in the tank 51 initially operates as a catalyst for decomposing the hydrogen peroxide. Then, the activated carbon 11 adsorbs each organic substance on its surface, and the organic substance is oxidated by the oxygen gas generated through the decomposition of the hydrogen peroxide, so that the activated carbon exposes its new surface. Then, the activated carbon operates again as a catalyst for decomposing the hydrogen peroxide and adsorbs each organic substance on its surface. Thus, the activated carbon in the tank 51 operates by repeating the series of cycles. Therefore, it is not required to take the trouble of providing two or more activated carbon adsorption towers and alternately performing the adsorption and desorption as in the prior art shown in FIG. 4, thereby allowing the equipment control to be easily executed.

Furthermore, in the third decomposition section 8, the hydrogen peroxide has been already decomposed to a certain extent, and the hydrogen peroxide influences less than in the first decomposition section 16. Therefore, microbes are generated to a certain extent to be able to increase there. Such microbes are useful for treating each organic substance contained in the waste gas.

Thus, the hydrogen peroxide removal equipment 50 can treat the hydrogen peroxide containing waste water as well as the organic substance containing waste gas. Therefore, in contrast to the case where those treatment processes are executed in separate systems, the initial cost and running cost can be reduced. Furthermore, the variation in amount of the hydrogen peroxide containing waste water and the variation of the hydrogen peroxide concentration occurring in the semiconductor plant can be satisfactorily dealt with, thereby allowing the equipment control to be easily executed. Furthermore, the installation space of the equipment can be saved. It is to be noted that the present equipment can efficiently decompose the hydrogen peroxide so long as the gas diffusing pipe 12 upwardly discharges the gas even when no organic substance is contained in the waste gas.

For the activated carbon 11, it is convenient to adopt those having a diameter of about 2 to 3 mm (4 mm at maximum) obtained on the market. As to the activated carbon 11, there is the standard of incorporating the activated charcoal by an amount of about 0.5% with respect to the capacity of the tank 51. However, this is not the absolute condition, and the optimum incorporation amount is to be determined strictly by the hydrogen peroxide concentration in the inflow waste water, the amount of waste gas to be treated and the like.

The holes of the water sprinkling pipe 19 are each required to be set to a size greater than the size of the activated carbon 11 so that they are prevented from being clogged with the activated carbon 11. In practice, by setting the hole size to a size four or more times greater than the size of the selected activated carbon 11, the clogging can be prevented without any problem.

The total area of the holes dispersedly formed at the equalizing plate 25 is calculated based on the flow amount of the gas (the organic substance containing waste gas and the oxygen gas generated in the first decomposition section 16 and the second decomposition section 17) to be put through the equalizing plate 25 and the amount of the waste water. In concrete, a sum total of an area through which the organic substance containing waste gas and the oxygen gas can pass per unit time and an area through which the waste water can pass per unit time is calculated to be the total area of the holes of the equalizing plate 25. The diameter of each hole of the equalizing plate 25, which also depends on the size of the selected activated charcoal 11, is demanded to be five or more times greater than the diameter of the activated carbon 11, and it is proper to set the diameter to about 10 mm.

Results of waste water treatment obtained by actually operating the hydrogen peroxide removal equipment 50 will be described next.

In the hydrogen peroxide removal equipment 50, the volume of the first decomposition section 16 was set to 600 litters, the volume of the second decomposition section 17 was set to 400 litters, and the volume of the third decomposition section 8 was set to 500 litters. As a result of treating a hydrogen peroxide containing waste water which has a hydrogen peroxide concentration of 346 ppm prior to the treating, the hydrogen peroxide concentration was able to be reduced to 1 ppm through the treatment.

Further, isopropyl alcohol was measured as a representative of the organic substance in the waste water. As a result of treating the waste gas having an isopropyl alcohol concentration of 1 mg/(NM$^3$) in the waste gas pipe 4, the isopropyl alcohol concentration in the waste gas duct 20 at the upper portion of the tank 51 was able to be reduced to 0.2 mg/(NM$^3$) or less, i.e., not greater than one fifth of that prior to the treatment.

Figure 3:
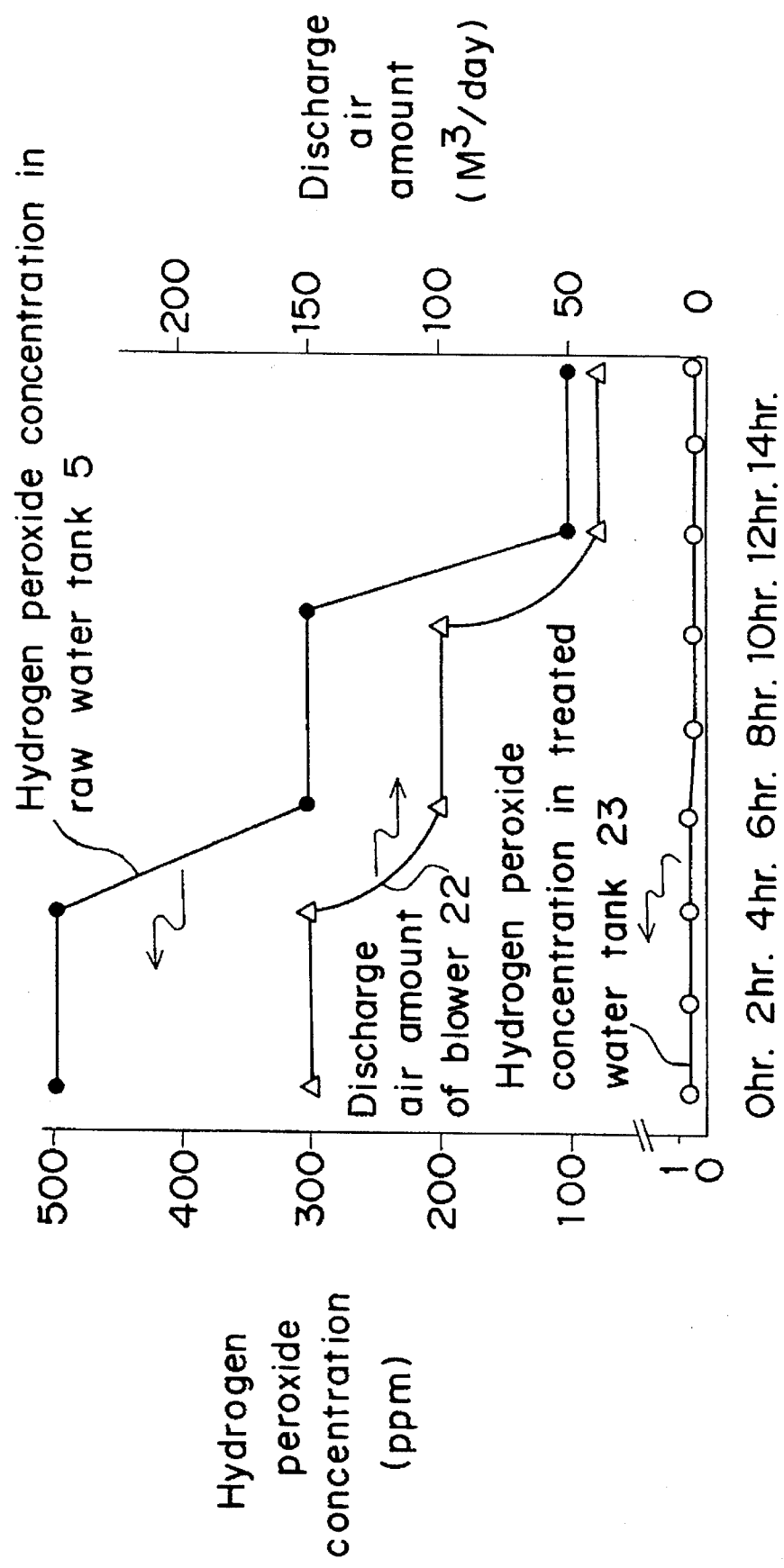
FIG. 3 is a graph showing a waste water treatment result obtained by the waste water treatment system shown in FIG. 1.

Furthermore, as shown in FIG. 3, by intentionally varying the hydrogen peroxide concentration prior to the treatment, the hydrogen peroxide concentration obtained through the treatment was measured. In concrete, the hydrogen peroxide concentration in the raw water tank 5 was varied in time from 500 ppm at maximum to 100 ppm at minimum. In the present case, the control section 60 executes the inverter control of the blower 22 according to the hydrogen peroxide concentration detected by the oxidation reduction electrometer 34 in the activated carbon sedimentation section 24, thereby controlling the pumping amount of the air lift pump 18. As a result, a hydrogen peroxide concentration of not greater than 1 ppm was able to be achieved stably. Therefore, for example, a tolerance of the hydrogen peroxide concentration detected by the oxidation reduction electrometer 34 can be set to 0.3 to 0.5 ppm. When the hydrogen peroxide concentration detected by the oxidation reduction electrometer 34 exceeds the tolerance, the number of revolution of the blower 22 is increased to increase the pumping amount of the air lift pump 18, thereby allowing the hydrogen peroxide concentration to be reduced. When the hydrogen peroxide concentration detected by the oxidation reduction electrometer 34 falls below the tolerance, the number of revolution of the blower 22 is decreased to allow energy saving to be achieved.

Figure 2:
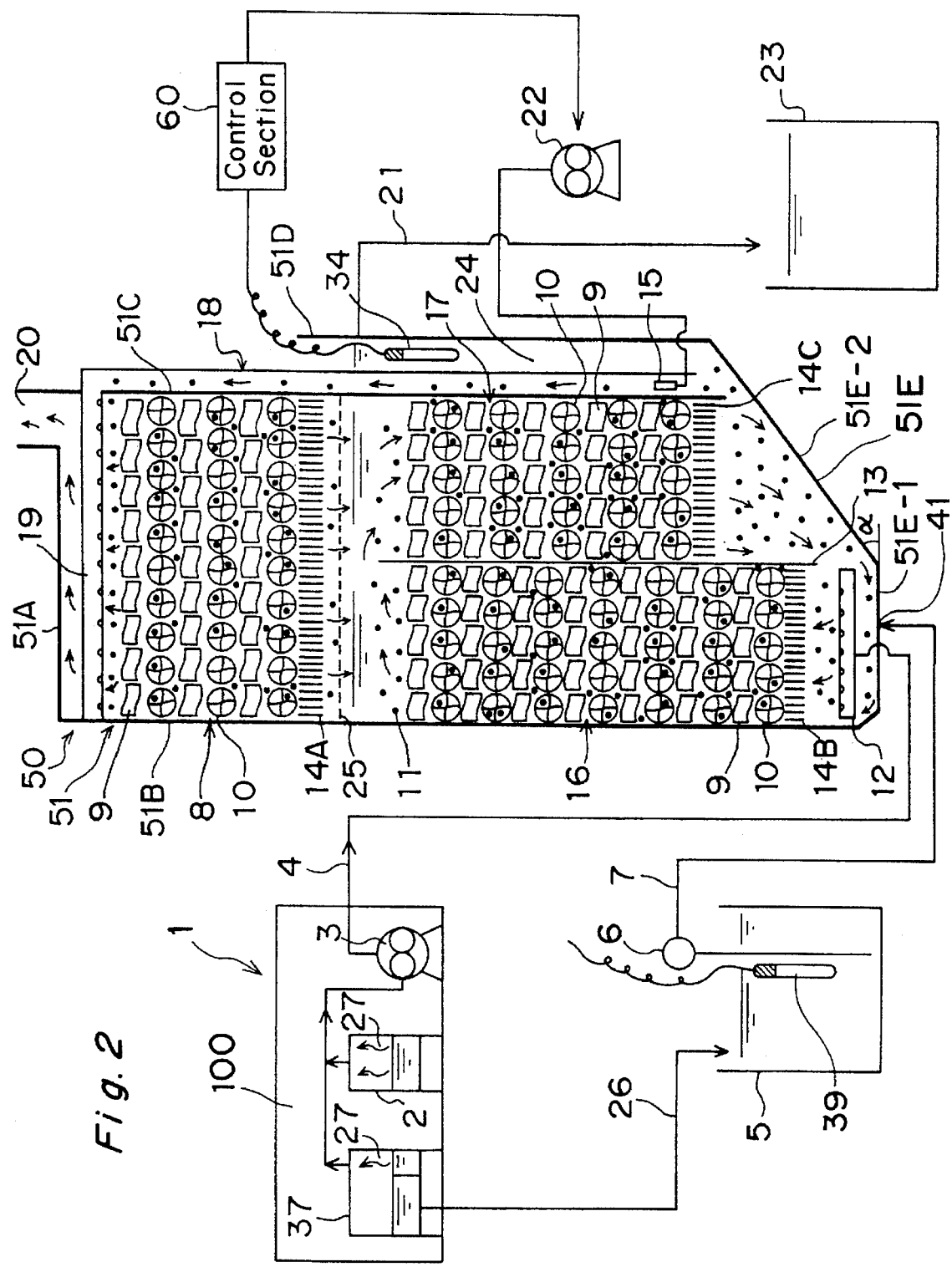
FIG. 2 is a diagram showing a modification example of the waste water treatment system shown in FIG. 1 wherein its raw water tank is provided with an oxidation reduction electrometer.

As shown in FIG. 2, an oxidation reduction electrometer 39 may be installed inside the raw water tank 5. When such an arrangement is adopted, the hydrogen peroxide concentration of the inflow waste water can be detected by the oxidation reduction electrometer 39 at a time point earlier than in the construction shown in FIG. 1. Therefore, by controlling the pumping amount of the air lift pump 18 by the control section 60 based on the hydrogen peroxide concentration detected by the oxidation reduction electrometer 39, the variation in quantity and quality of water can be dealt with more speedily.

As apparent from the above description, according to the hydrogen peroxide removal equipment of the present invention, the hydrogen peroxide containing waste water is subjected to the primary treatment in the first decomposition section and the second decomposition section and to the secondary treatment in the third decomposition section. Therefore, the capability of removing the hydrogen peroxide can be improved. Therefore, the variation in amount of the hydrogen peroxide containing waste water and the variation of the hydrogen peroxide concentration occurring in the semiconductor plant can be satisfactorily responded, so that the equipment control can be easily executed.

Particularly when the charcoal is implemented by the bincho charcoal having a specific gravity of not smaller than one, the charcoal itself does not float even if the first decomposition section and the second decomposition section are immersed in the waste water.

According to the hydrogen peroxide removal equipment of the above embodiment, the activated carbon put in the tank passes through the first decomposition section, the second decomposition section and the third decomposition section together with the waste water. Therefore, by virtue of the multiplier effect of the charcoal put in the fixed state and the activated carbon which flows together with the waste water, the capability of decomposing the hydrogen peroxide can be remarkably improved.

According to the hydrogen peroxide removal equipment of the above embodiment, the first decomposition section, the second decomposition section and the third decomposition section are each constituted by alternately laminating in the vertical direction the charcoal layer in which the charcoal pieces are arranged horizontally with a space capable of allowing water and gas to pass therethrough and the plastic material layer in which the plastic material pieces are arranged horizontally. Therefore, the water and gas are allowed to pass through the space smoothly. Furthermore, when the waste water passes through the first decomposition section, the second decomposition section and the third decomposition section in the vertical direction, there is assured an increased frequency of contact of the waste water with the charcoal. Therefore, the capability of decomposing the hydrogen peroxide in the waste water can be further improved.

According to the hydrogen peroxide removal equipment of the above embodiment, the activated carbon in the waste water surely settles in the activated carbon sedimentation section. Therefore, the activated carbon can be prevented from flowing out through the outlet port, thereby allowing the quality of the treated water flowing out from the outlet port to be assured.

According to the hydrogen peroxide removal equipment of the above embodiment, the activated carbon that has passed through the second decomposition section together with the waste water to reach the position below the second decomposition section as well as the activated carbon that has settled in the activated carbon sedimentation section easily move to the first decomposition section due to the downward inclined portion of the bottom plate. Therefore, the activated carbon put in the tank circulates throughout the entire inner region of the tank without staying in a specific position, thereby allowing the hydrogen peroxide in the waste water to be effectively decomposed.

According to the hydrogen peroxide removal equipment of the above embodiment, the control section controls the pumping amount of the air lift pump according to the oxidation reduction electric potential of the waste water in the activated carbon sedimentation section. Therefore, the variation in amount of the hydrogen peroxide containing waste water and the variation of the hydrogen peroxide concentration occurring in the semiconductor plant can be dealt with speedily and economically, thereby allowing the equipment control to be more easily executed.

According to the hydrogen peroxide removal equipment of the above embodiment, the hydrogen peroxide containing waste water as well as the organic substance containing waste gas can be treated. Therefore, in contrast to the case where those treatment processes are executed in separate systems, the initial cost and running cost can be reduced. Furthermore, the variation in amount of the hydrogen peroxide containing waste water and the variation of the hydrogen peroxide concentration occurring in the semiconductor plant can be satisfactorily dealt with. Therefore, the equipment control can be easily executed. Furthermore, the installation space of the equipment can be saved.

Particularly when a granular or powdery activated carbon is put in the tank, the flowing activated carbon adsorbs each organic substance in the waste gas, and each organic substance is subsequently oxidized by the oxygen gas generated. In this stage, a new surface of the activated charcoal is exposed to adsorb thereon again each organic substance in the waste gas. That is, the activated carbon in the tank operates by repeating the series of cycles in order to treat each organic substance in the waste gas. Therefore, it is not required to take the trouble of providing two or more activated carbon adsorption towers and alternately executing the adsorption and desorption as in the prior art shown in FIG. 4, thereby allowing the equipment control to be more easily executed.

According to the hydrogen peroxide removal equipment of the above embodiment, the equalizing plate diffuses the waste gas and the oxygen gas that have moved upwardly through the first decomposition section uniformly in the horizontal direction. Therefore, the waste gas and the oxygen gas move upwardly uniformly in the entire region of the third decomposition section. Therefore, the third decomposition section fully functions to allow each organic substance in the waste gas to be efficiently treated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydrogen peroxide removal equipment which introduces a waste water through a supply port into a tank, decomposes hydrogen peroxide in the introduced waste water inside the tank, and discharges the waste water through an outlet port, comprising:

a first decomposition section, a second decomposition section and a third decomposition section constituted by combining a charcoal and a plastic material having a void for allowing water and gas to pass therethrough inside the tank, wherein the first decomposition section and the second decomposition section are provided below a water surface level of the waste water introduced into the tank and are arranged on both sides of a vertical partition plate located apart from a bottom plate of the tank, and the third decomposition section is provided above the water surface level of the waste water and is arranged above the first decomposition section and the second decomposition section;

a gas discharging section which upwardly discharges a gas from below the first decomposition section to generate in the waste water introduced into the tank a circulating current which flows over an upper end of the partition plate to reach the second decomposition section from the first decomposition section and returns from the second decomposition section to flow under a lower end of the partition plate to the first decomposition section; and a water sprinkling means for pumping up the waste water inside the tank and sprinkling the waste water on the third decomposition section.

2. A hydrogen peroxide removal equipment as claimed in claim 1, wherein a granular or powdery activated carbon capable of flowing together with the waste water is put in the tank, and the first decomposition section, the second decomposition section and the third decomposition section are capable of allowing the activated carbon contained in the waste water to pass in a vertical direction.

3. A hydrogen peroxide removal equipment as claimed in claim 1, wherein the first decomposition section, the second decomposition section and the third decomposition section are constituted by alternately laminating in a vertical direction a charcoal layer in which pieces of the charcoal are arranged horizontally with space for allowing water and gas to pass therethrough and a plastic material layer in which pieces of the plastic material are arranged horizontally.

4. A hydrogen peroxide removal equipment as claimed in claim 2, wherein an inner wall located apart from the bottom plate of the tank is provided on a side opposite to the partition plate with respect to the second decomposition section, and an outer wall which continues from the bottom plate of the tank and has an outlet port is provided outside the inner wall, thereby forming between the inner wall and the outer wall an activated carbon sedimentation section for allowing the activated carbon in the waste water to settle.

5. A hydrogen peroxide removal equipment as claimed in claim 3, wherein an inner wall located apart from the bottom plate of the tank is provided on a side opposite to the partition plate with respect to the second decomposition section, and an outer wall which continues from the bottom plate of the tank and has an outlet port is provided outside the inner wall, thereby forming between the inner wall and the outer wall an activated carbon sedimentation section for allowing the activated carbon in the waste water to settle.

6. A hydrogen peroxide removal equipment as claimed in claim 4, wherein a portion which belongs to the bottom plate of the tank and is located below the activated carbon sedimentation section and the second decomposition section is inclined downward toward the first decomposition section.

7. A hydrogen peroxide removal equipment as claimed in claim 5, wherein a portion which belongs to the bottom plate of the tank and is located below the activated carbon sedimentation section and the second decomposition section is inclined downward toward the first decomposition section.

8. A hydrogen peroxide removal equipment as claimed in claim 4, wherein the water sprinkling means has an air lift pump for pumping up the waste water through a pipe which extends from a position below the water surface level of the waste water to a position above the third decomposition section, further comprising an oxidation reduction electrometer in the activated carbon sedimentation section, and a control section for controlling a pumping amount of the air lift pump according to an oxidation reduction electric potential of the waste water detected by the oxidation reduction electrometer.

9. A hydrogen peroxide removal equipment as claimed in claim 5, wherein the water sprinkling means has an air lift pump for pumping up the waste water through a pipe which extends from a position below the water surface level of the waste water to a position above the third decomposition section, further comprising an oxidation reduction electrometer in the activated carbon sedimentation section, and a control section for controlling a pumping amount of the air lift pump according to an oxidation reduction electric potential of the waste water detected by the oxidation reduction electrometer.

10. A hydrogen peroxide removal equipment as claimed in claim 1, wherein the gas discharging section comprises a gas diffusing pipe which is arranged below the first decomposition section and has holes for discharging a gas, and a pipe for supplying an organic substance containing waste gas through the wall surface of the tank is connected to the gas diffusing pipe.

11. A hydrogen peroxide removal equipment as claimed in claim 10, wherein an equalizing plate formed with a plurality of dispersedly arranged through holes capable of allowing the water, gas and activated carbon to pass therethrough is provided horizontally below the third decomposition section and above the water surface level of the waste water.

* * * * *